United States Patent [19]

Grant et al.

[11] 4,327,898
[45] May 4, 1982

[54] TRAVELING TORCH

[75] Inventors: Gerald B. Grant; Roger J. Madsen; David A. Laing, all of Denton, Tex.

[73] Assignee: Victor Equipment Company, Denton, Tex.

[21] Appl. No.: 250,633

[22] Filed: Apr. 3, 1981

[51] Int. Cl.³ .............................................. B23K 7/10
[52] U.S. Cl. ...................................... 266/67; 266/72; 266/73
[58] Field of Search ............................ 266/67, 72, 73

[56] References Cited

U.S. PATENT DOCUMENTS

| | | | |
|---|---|---|---|
| 2,515,302 | 7/1950 | Hughey | 266/67 |
| 2,541,344 | 2/1951 | Davis | 266/67 |
| 3,596,892 | 8/1971 | Nakanishi et al. | 266/67 |

*Primary Examiner*—W. Stallard
*Attorney, Agent, or Firm*—James C. Fails

[57] ABSTRACT

What is disclosed is a traveling torch comprising a carriage mounted on wheels and adapted to traverse a track; motor and variable speed traction drive transmission for moving the carriage along the track and carried by the carriage with the weight of the motor toward a first side; a torch rack holder for holding a torch, the torch rack holder being carried by the carriage with its weight toward a first side, the torch rack holder being asymmetrically mounted and extending above and across the carriage so as to carry the torch laterally beyond the second side of the carriage; a torch having a body, tip, and respective fuel and oxygen passageways connected with respective fuel and oxygen conduit means for conveying respective fuel and oxygen to respective fuel and oxygen passageways in the torch and flexible fuel and oxygen conduits connected with respective sources. Also described are preferred embodiments wherein the carriage is bi-directional with controls disposed at each end of the carriage and accesible to an operator; and where, respectively, there are provided, rack handle, dual function rear wheels, power take-off, and angle iron track option.

14 Claims, 13 Drawing Figures

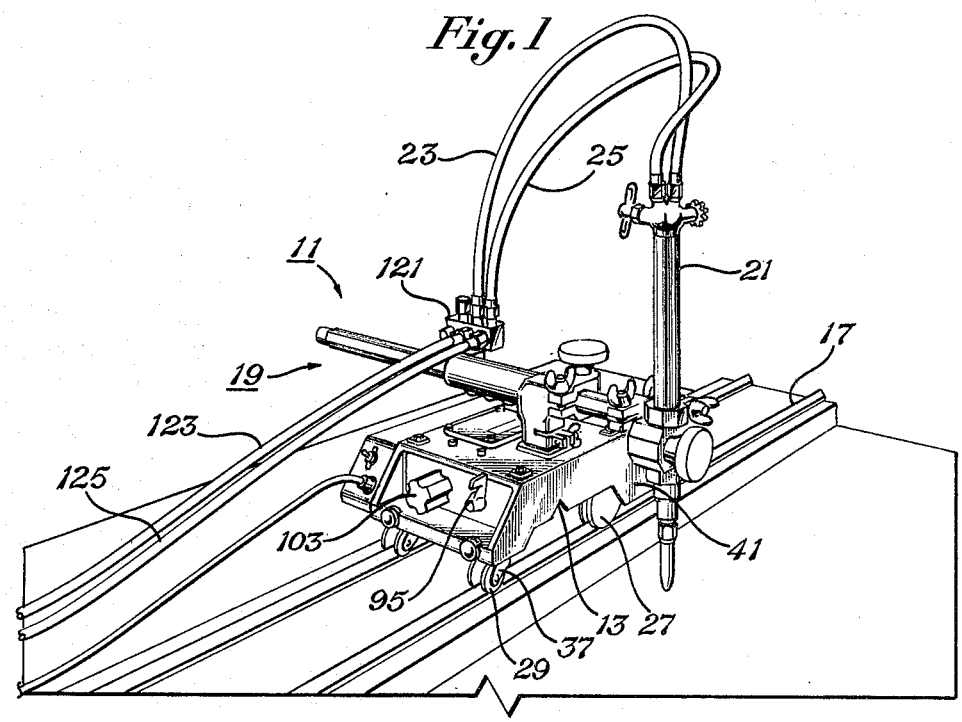
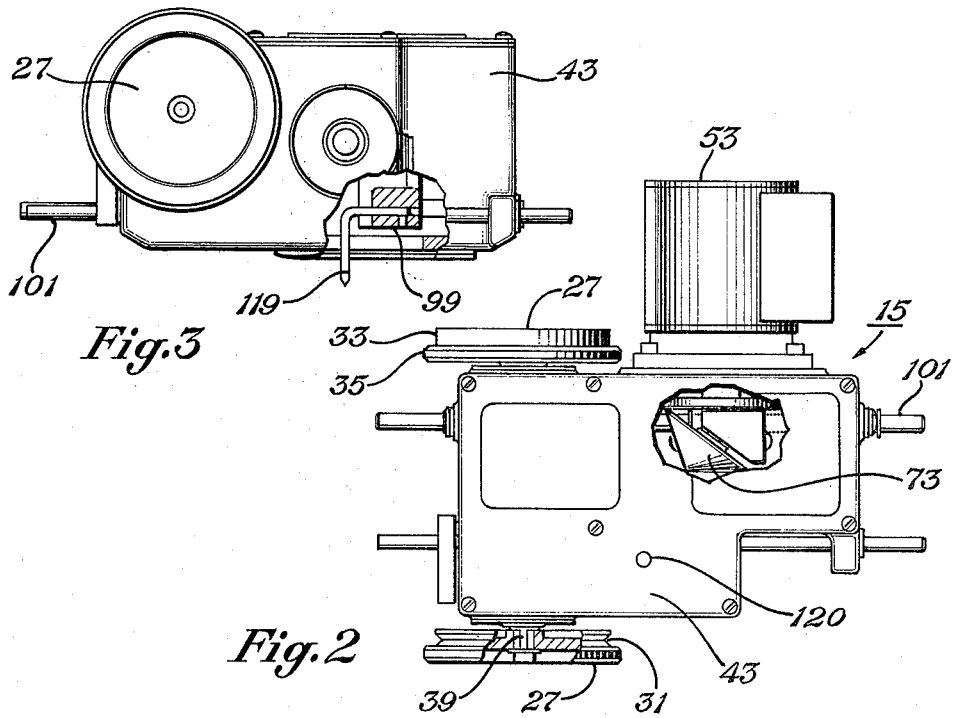

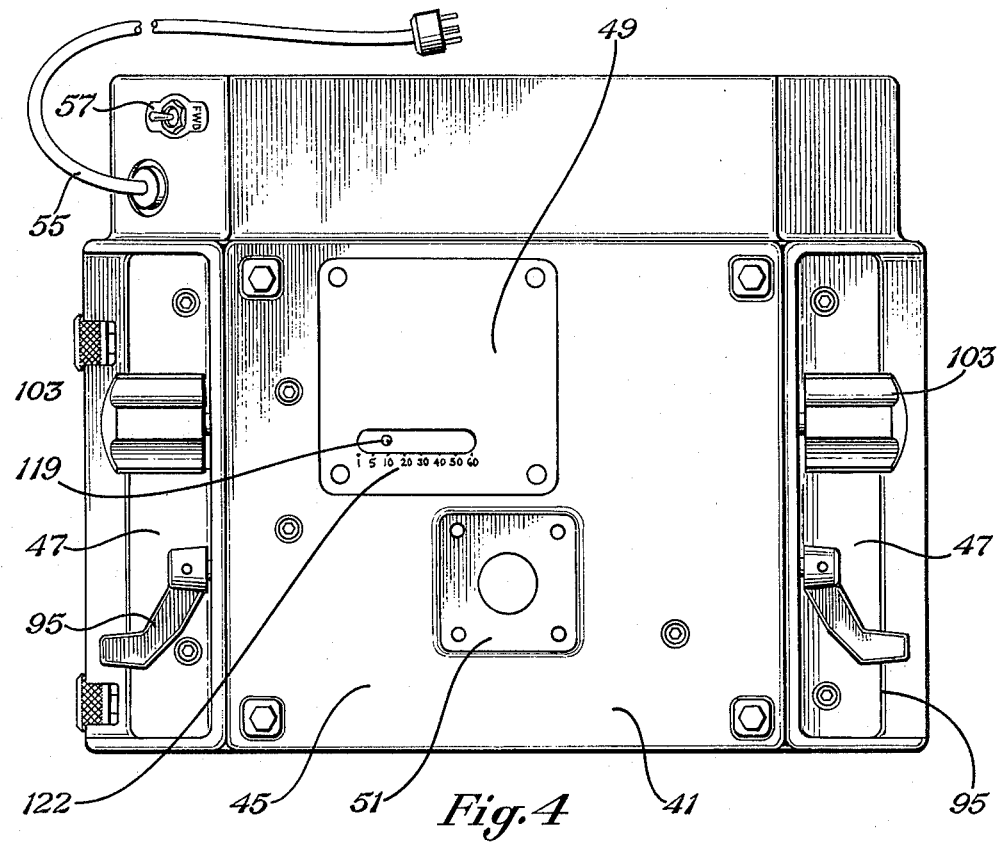
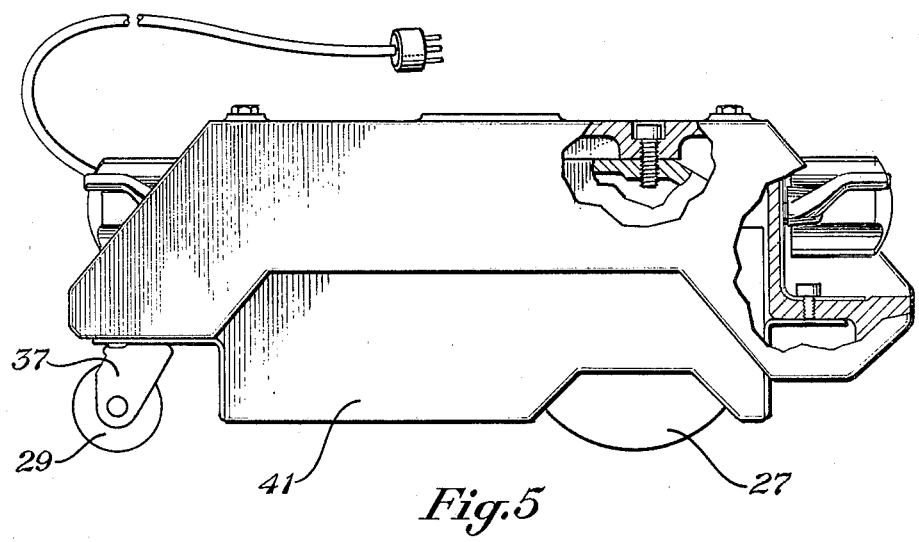

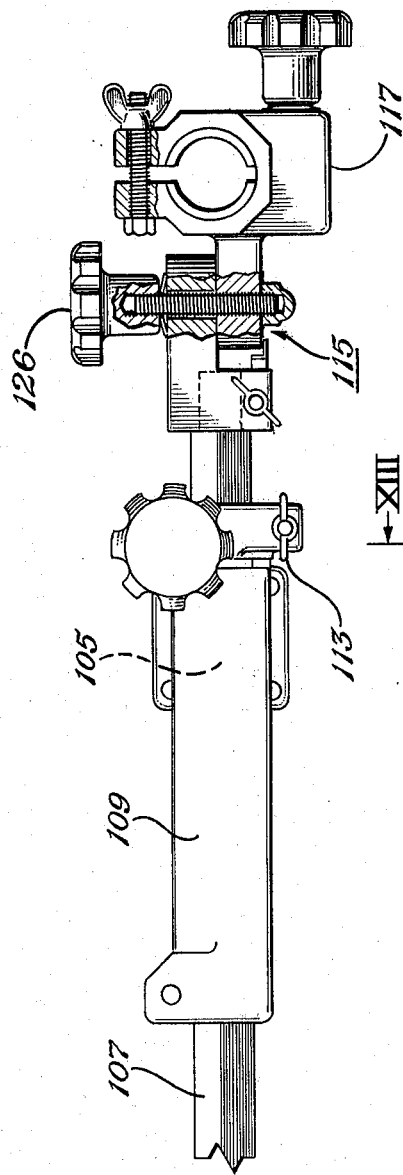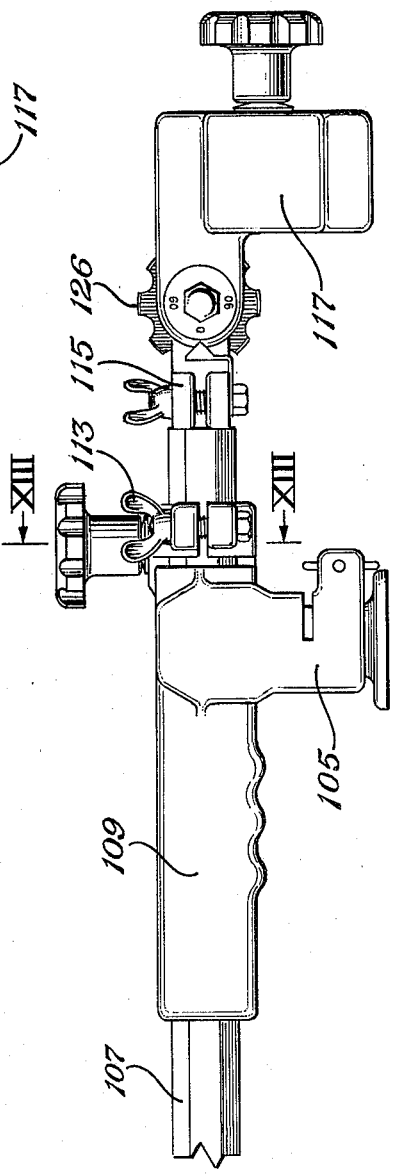

TRAVELING TORCH

FIELD OF THE INVENTION

This invention relates to traveling torches. More particularly, it relates to torches carried by wheeled carriages and adapted to traverse along a track to provide the desired cut through sheet metal plate or the like.

DESCRIPTION OF THE PRIOR ART

The prior art has seen the development of a wide variety of approaches to heating and cutting torches. It has included small hand held torches and machine torches. Finally, the art progressed to more elaborate gas cutting machines such as disclosed in U.S. Pat. Nos. 3,540,263; 3,619,301 and 4,014,528 wherein the free end of the torch was mounted on a wheeled structure. One of the more recent developments, although no patent was found thereon, includes a wheeled carriage carrying a torch with a guide wheel and front mounted carrying handle, remote clutch lever and the like on a relatively complex carriage that has many protrusions. It was prone to tip over once the torch was moved very far from the carriage, and was subject to variation in speed control because of the heat from cutting too close to the carriage. Moreover the prior art did not provide the option of traversing a flat surface, or an angle iron track as well as a conventional expensive track especially designed for that purpose.

Specifically, it is desirable that the traveling torch have the following features not heretofore provided. 1. The traveling torch should include a self-contained tractor, allow semi-automatic flame cutting of straight lines or curved lines at a spaced distance from a track on a metal plate without the need for the tractor to stop and start off the ends of the plate. 2. The torch should travel along a relatively inexpensive track that can be made of relatively long material rather than the prior art type of expensive, short track lengths requiring several lengths to be purchased. 3. The torch track should be stiff in the vertical direction; rather than less rigid as in the prior art which make difficult the moving of the track and tractor, or carriage, by picking up the track ends. 4. The traveling torch should have a design that is stable when running without the propensity to tip over. 5. The traveling torch should be balanced when picked up by its handle to facilitate replacement on the track without having to use care and both hands. 6. The traveling torch should have its motor switch and wiring away from the heat so that splattering from molten metal, varation in speed control because the heat, and the like are avoided. 7. The traveling torch should incorporate the carrying handle into the rack holder for the torch. 8. The traveling torch should use nonlubricated bushing for the rack and have a rack bar that is lightweight, yet strong. 9. The traveling torch should have an overall configuration that is bi-directional with controls at both ends so that the operator can control it easily. 10. The traveling torch should have a carriage that has no protruding knobs, switches, or levers to impede its use. 11. The traveling torch should have a direct reading traveling speed indicator. 12. The traveling torch should have a flat top that facilitates mounting and other equipment; such as, MIG, TIG, plasma torch and the like. 13. The traveling torch should have rear wheels that are multifunctional and can run on conventional expensive track; on less expensive, longer, more rigid angle iron track, or on a flat planar surface. 14. The traveling torch should have a power take off to allow integral drive for additional power driven accessories. 15. The traveling torch should have a drive that is relatively immune to heat effects, that has a high degree of speed range capabilities with a relatively constant input.

From the foregoing it can be seen that the prior art has provided a wide variety of approaches, even including computer controlled position detecting apparatus between a tool and work piece, uncut detecting means with a torch and even wheeled torches but have failed to provide the desirable features delineated hereinbefore.

SUMMARY OF THE INVENTION

Accordingly, it is an object of this invention to provide a traveling torch that has one or more of the features delineated as desirable hereinbefore but not heretofore provided by the prior art.

It is another object of this invention to provide a traveling torch that has substantially all of the features delineated as desirable hereinbefore but not heretofore provided by the prior art.

These and other objects will become apparent from the descriptive matter hereinafter, particularly when taken in conjunction with the appended drawings.

In accordance with this invention, there is provided a traveling torch comprising:
 a. a carriage mounted on wheels and adapted to traverse a track;
 b. power means for moving the carriage along the track, the power means being carried by the carriage with a major portion of its weight toward a first side;
 c. a torch holding means for holding the torch; the torch holding means being carried by the carriage with a major portion of its weight toward the first side; the torch holding means being asymmetrically mounted and extending above and across the carriage so as to carry the torch laterally beyond the second side of the carriage opposite the first side;
 d. a torch having a body, tip and respective fuel and oxygen passageways connected with respective fuel and oxygen conduits for conveying respective fuel and oxygen to the torch; and flexible fuel and oxygen conduits connected with the respective sources and with the torch.

In a preferred embodiment, the power means includes an electric motor and the motor and wiring that are disposed on the first side so as to be away from the heat generated by the torch. No speed control electronics is required for the electric motor.

Also on the preferred embodiment, the torch holding means includes a rack holder that includes a handle so placed that the traveling torch is balanced when picked up by the handle.

A still more specific embodiment, the carriage is bidirectional with controls disposed at each end of the carriage so as to be accessible to the operator and the carriage has all its control knobs and protrusions within its longitudinal and lateral dimensions so as to have no protrusions exteriorly thereof.

Also in the preferred embodiment, the traveling torch includes a variable speed traction drive; its rear wheels having multiple capabilities for driving on a planar surface, a standard groove track or an angle iron track. The carriage has a planar top for accessories and the torch includes a power take off means for driving accessories.

BRIEF DESCRIPTION OF DRAWINGS

FIG. 1 is a perspective view of the traveling torch in accordance with one embodiment of this invention.

FIG. 2 is a bottom plan view of the inner case assembly of FIG. 1.

FIG. 3 is a side elevational view of the inner case assembly of FIG. 2.

FIG. 4 is a top plan view of the torch carriage of FIG. 1.

FIG. 5 is side elevational view of the torch carriage of FIG. 4.

FIG. 6. is a top plan view of the rigging assembly, or torch rack holder, of one embodiment of this invention.

FIG. 7 is a side elevational view of the torch rack holder of FIG. 6.

DESCRIPTION OF THE PREFERRED EMBODIMENTS

Figure 8:
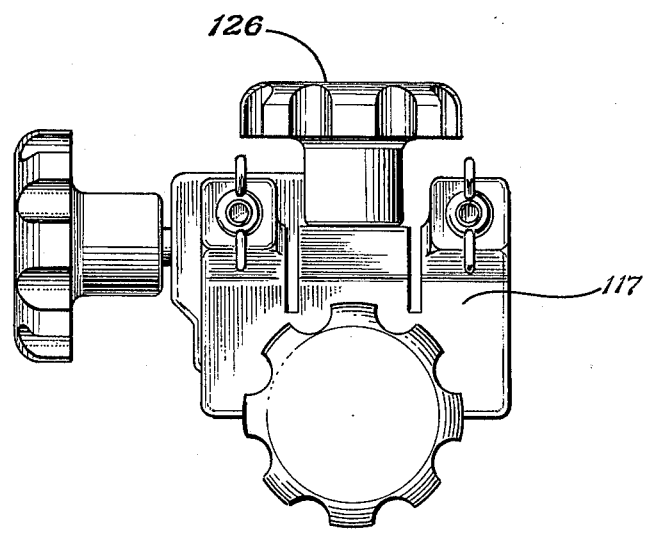
FIG. 8 is an end elevational view of the torch rack holder of FIG. 6.

Referring to the FIGS. and more particularly to FIG. 1, the traveling torch 11 includes a carriage 13, a power means 15, FIG. 2, for moving a carriage along a track 17, FIG. 1, a torch holding means 19 for holding the torch, a torch 21 and flexible fuel and oxygen conduit means 23, 25 connected respectively with fuel and oxygen sources and fuel and oxygen passageways in the traveling torch.

The traveling torch 11 has sufficient flexibility to run along a track for either straight line or arcuate cutting machines. Moreover, it can run along either conventional track, angle iron track, or on a planar surface merely guided parallel with the cut. In addition, it has the flexibility of allowing the power take off to drive other accessories, such as a rotating arm for cutting circles, portions of circles and the like. Moreover, its carriage may traverse at a desired speed or sit still as desired at the control of the operator.

The carriage 13 may comprise any of the conventional wheeled carriages having 3, 4 or more wheels to provide a stable, mobile platform for the torch. As illustrated, the carriage 13 has 4 wheels 27, 29. The rear wheels 27 have a smaller portion of lesser diameter for running on a track shown by the grooved section 31 and the flat, or cylindrical section 33. This allows the traveling torch to travel along tracks where there may be minor variations in the space between the track without binding. This can be significant, particularly where improvised track such as that made of angle iron is employed instead of the more expensive and less satisfactory flexible track of the prior art.

The rear wheels 27 also have a larger diameter cylindrical portion 35 for running on a planar surface or the like. Thus, it can be seen that the carriage can run on a planar surface, run with one wheel on a rail and the other wheel on a planar surface, run with both wheels on a track and tolerate minor variations in the spacing of the track and otherwise provide flexibility not heretofore provided in the prior art. The rear wheels 27 may be formed of any material. Preferably they are formed of heat resistant material such as metal and material that resists harm by splattered molten metal when the cut is being made along side the carriage 13.

The front wheels may take any form desired. Preferably, they are simply idler wheels that may or may not be designed to roll on a track 17. They are normally secured to the bottom of the carriage by suitable mounting brackets 37 and may or may not be castored. The one or two rear wheels 27 serve as the drive wheels and are connected with the rear axle by way of square key 39 so as to rotate in unison with the rear axle.

Figure 12:
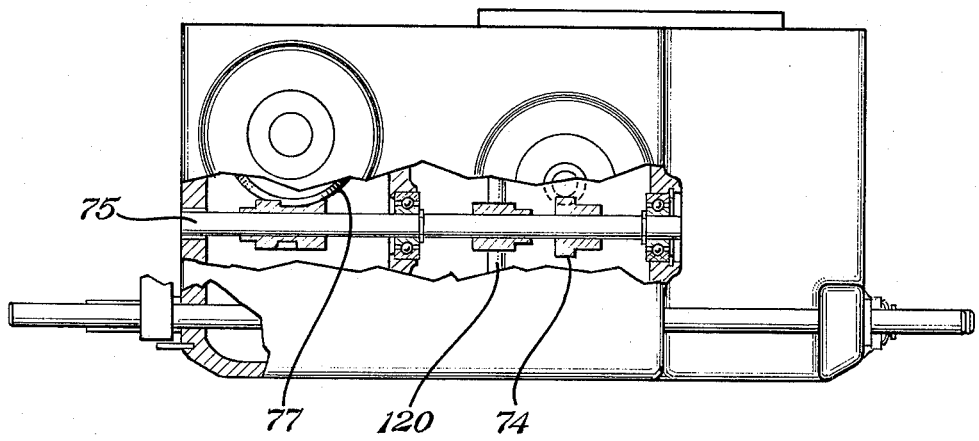
FIG. 12 is a partial side elevational view of the inner case subassembly of FIG. 10.

The carriage 13 includes an outer housing 41, FIG. 1 and an inner case assembly 43, FIGS. 2 and 3. The inner case assembly 43 has a plurality of doors and the like allowing access to the interior working parts while providing stability for the assembly. The outer housing 41, FIGS. 4 and 5, provides the means for attaching of the front wheels 29 as by brackets 37, FIG. 5, and provides the planar top platform 45 and the related end porches 47 having respective controls as described hereinafter. The housing 41 has a cover plate 49. Moreover, a cover plate 51, FIG. 4, allows access to a power take off drive shaft 120, FIGS. 10 and 12, for driving accessories (not shown). The outer housing 41 and the inner case assembly 43 provides the support for the power means 15.

The power means 15 is provided for moving the carriage along the track. The power means is carried by the carriage with its weight toward a first side so as to counter balance a torch being carried on the opposite side and provide a stable running platform for the torch. As illustrated, the power means includes an electric motor 53, its wiring and controls (such as conduit 55 and switch 57) that are carried on a first side of the carriage away from the heat. The switch 57 provides the option of forward or reverse operation of the motor 53. The power means 15 includes a variable speed drive means for traveling at a plurality of respective speeds and a direct reading speed indicator that is connected with the drive means and adapted to indicate the speed directly. Specifically, the power means 15 includes a two stage, three element, variable speed traction drive transmission 59, FIG. 10, for providing a variety of speeds with a constant running speed electric motor 53.

Figure 9:
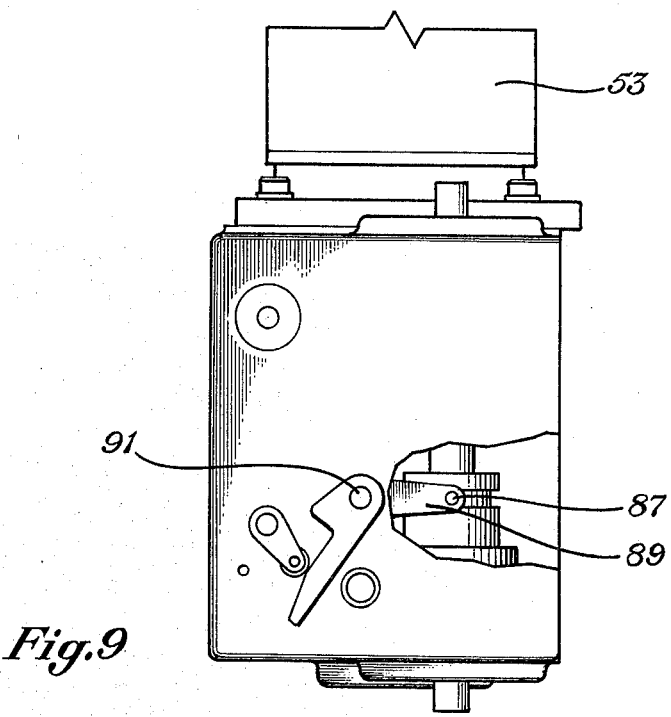
FIG. 9 is a partial side elevational view, partially cut away, of an inner case subassembly of the embodiment of FIG. 1.
Figure 11:
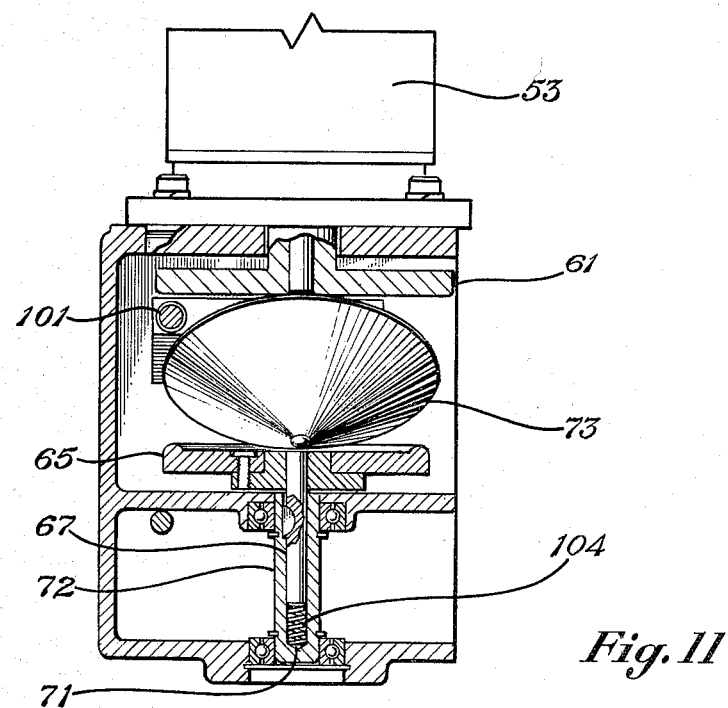
FIG. 11 is a partial end elevational view, partly broken away, of the inner case subassembly of FIG. 10.

Specifically, the variable speed transmission 59 includes an input traction disc 61 that is driven by the shaft 63 of the motor 53 and connected to rotate in unison therewith. The power means 15 also includes an output traction disc 65 disposed in the inner case assembly 43 and having an output shaft 67 connected so as to rotate in unison therewith. The output traction disc 65 and output shafts 67 are pushed upon by way of a spring 104 in a lower well 71, FIGS. 10 and 11. This spring force pushes upwardly with a predetermined force to frictionally engage the output traction disc 65 and the traction cone 73. The traction cone 73 can rotate counter clockwise in FIG. 11 about the speed adjusting shaft 101 to frictionally engage the input traction disc 61. The output shaft 67 drivingly engages via a worm 72, worm gear 74 arrangement, FIG. 12, the shaft 75. Similarly, the shaft 75, FIGS. 10 and 12, drivingly engages via a worm 76, FIG. 12, to worm gear 77, FIG. 10. The worm gear 77 arrangement has a lower serrated surface 81 that mates with the upper serrated surface 79 of a clutch mechanism. Specifically, the upper clutch plate 83 with the upper serrations 79 has an annular groove 85 into which is inserted from both sides pins 87 carried on respective bell cranks 89. The FIG. 9 bell cranks 89 are pivotally mounted and connected with the clutch shaft 91 such that when the clutch shaft is rotated the bell cranks 89 move the pins 87 upwardly and downwardly to engage or disengage the respective serrated surfaces for effecting rotation of the axle 93 and hence the rear wheels 27. The direction upwardly and downwardly is relative to the illustrated FIGS. 9 and 10 and is actually lateral motion transverse to the longitudinal axis of the carriage 13 when it is in the horizontal and normal running position. As will be appreciated, the clutch levers 95, FIGS. 1 and 4, on both the front and rear of the carriage allow the operator to control easily without having to reach around to the opposite end of the carriage from which he is standing.

From the foregoing, it can be seen that the power means 15 includes the clutch that is connected intermediate the power output disc 65 and the driving wheel 27 so as to allow the operator to connect and interrupt at his wishes, the drive to the wheel, or wheels, on the rear axle.

Figure 10:
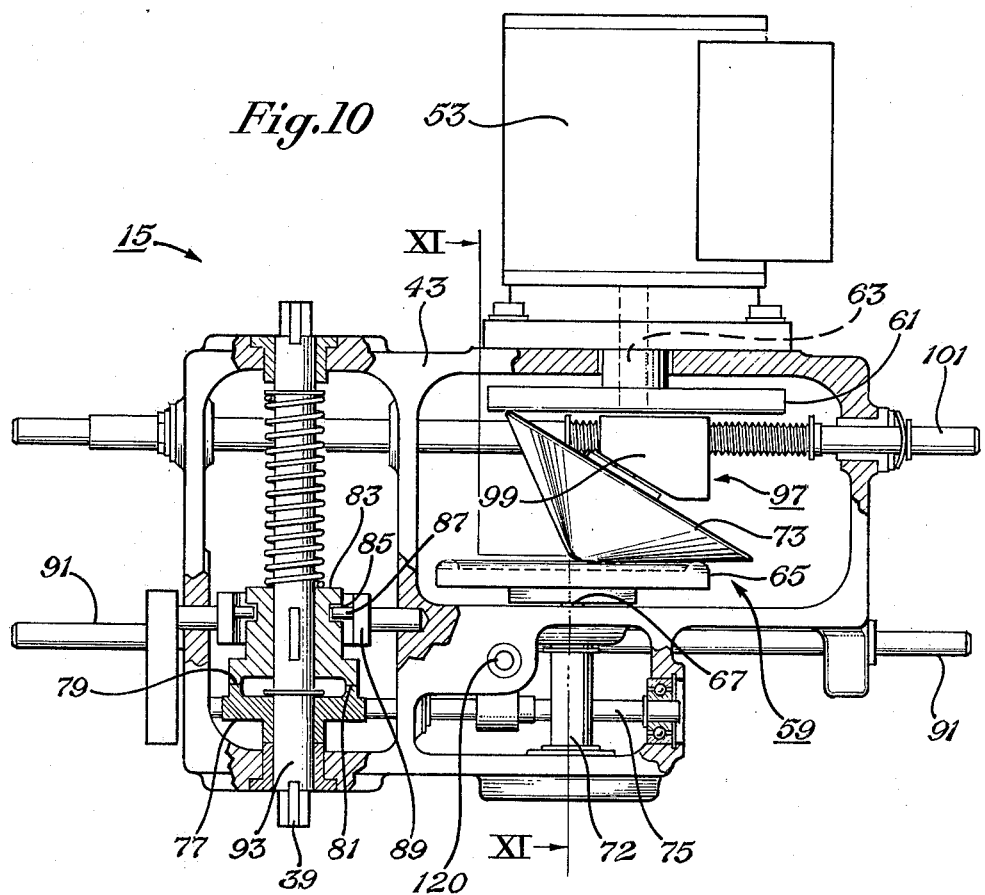
FIG. 10 is a bottom plan view with a partial cross section of the inner case subassembly showing the drive means and rear axle and transmission.

The traction cone 73, FIG. 10, is disposed angularly intermediate and engaging the input and output discs 61 and 65 along, respectively, the base and the conical portions such that movement of the traction cone 73 will move the respective points of contact with the respective input and output discs and vary the speed of the output shaft 67 over a wide speed range with respect to the motor shaft 63. With this arrangement, a variable speed in the range of 60:1 can be achieved. This is much better than the best prior art type variable speed traction drives.

The power means 15 also includes a means 97 for moving the frusto-conical idler with respect to the input and output discs for effecting the respective speeds. Specifically, the means 97 for moving the traction cone 73 comprises a base 99 that is threadedly mounted on and engaging a threaded shaft 101. The shaft 101 is referred to as the speed adjustment shaft and extends to the front and rear of the carriage 13 to allow control by the operator at either end. Respective speed adjustment control knobs 103, FIGS. 1 and 4, are provided to facilitate operator control. Thus it can be seen that as the shaft 101 is rotated in one direction, the base 99 and hence the traction cone 73 is moved in a first direction. Conversely, rotation of the shaft in the opposite direction causes it to move in the opposite direction. The respective directions of movement determine whether the ratio of the output speed to the input speed increases or decreases. As illustrated in FIG. 10, the output shaft 67 speed to motor shaft 63 speed ratio is approximately unity. Movement of the base 99 to the right, FIG. 10, will decrease the radius to contact on the traction cone with the output traction disc 65 and decrease the radius of contact on the input traction disc 61 such that the rotational speed of the output shaft 67 will decrease dramatically. Conversely, the output speed is increased as the base 99 is moved to the left. Because there is a constant speed motor 53 and the speed ratio of the variable speed traction drive transmission 59 is proportional to the base 99 position, a direct reading speed indicator is provided by the pointer 119 in FIG. 3 by pointing to a fixed calibrated speed scale 122, FIG. 4.

The track 17 may comprise any of the conventional track, angle iron track or any other special purpose track to guide the traveling torch and carry the carriage in a permanent way so as to enable placing sheet metal or the like next to the track base for cutting of the sheet metal. A preferred embodiment is to use economical but stiff angle iron track that is joined together by suitable spacers that may have a cut out portion at the desired spacing of the upperly extending flanges of the angle iron track. An inner tie with bolt and threaded aperture engaging the bolt can be employed to hold the track in place with the back of the angle iron against the cut out portion of the ties or spacers on the exterior of the track.

The torch holding means 19 includes a rack holder, FIGS. 6-8, that includes a substantially vertically oriented member 105, a substantially horizontally oriented member 107 that is slidably connected with the vertically oriented member so as to accommodate disposing the torch at a plurality of distances from the second side of the carriage and still provide a stable traveling torch when running. Substantially horizontal member 107 includes, directly or indirectly a handle 109 for picking up and carrying the traveling torch. As indicated, the handle 109 is actually integrally a part of the vertically oriented member housing 105 that is connected to an interior vertical stanchion 111. The stanchion 111 may be bolted or screwed to the top of the carriage. A large racking knob 132 can be utilized to rotate a gear 128 that engages a rack 130 and effects retraction and extension laterally of the horizontal member 107 for putting the torch as desired. A wing nut 113 is tightened to hold an attained position of the horizontal member 107.

Figure 13:
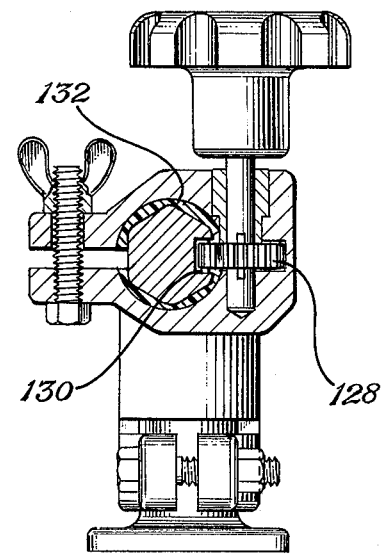
FIG. 13 is a partial cross-sectional view taken along the line XIII—XIII of FIG. 7.

The horizontal member 107 carries the torch 21 by way of a knuckle arrangement 115 and an on-center torch holder 117. The knuckle arrangement 115 includes threaded stud and knob 126 to join tabs of, respectively, the knuckle and torch holder and allow positioning and retention at a desired angle. The on-center torch holder 117 prevents a torque component that would bind the horizontal member 107 when the torch is being held. The competing prior art type holders have not had this feature. Referring to FIG. 13, the rack holder includes a bushing 132 that does not require lubrication. Specifically, the bushing 132 is formed of a material; such as phenolic polymer, nylon, Delrin, fabric-reinforced fiber glass, Teflon; that has a non-galling engagement with the horizontal member 107. The respective circular nuts and wing nuts allow achieving the desired angles and tightness on the respective clamps, brackets and the like.

The torch holding means may be made of any structurally strong enough material. For example, aluminum or steel has adequate structural strength to do the job and is adequately resistant to heat. On the other hand, more expensive material such as copper, brass and the like could be employed if desired. It is even possible to employ a plastic for certain portions, although the stress may cause cold flow of plastics in the vertical and horizontal members.

The torch 21 is a conventional machine cutting torch or the like and may take a wide variety of forms. One excellent such torch is that put out by Victor Equipment Company, Denton, Tex. As will be appreciated, any other suitable cutting torch can be employed. Ordinarily, the cutting torches have respective oxygen and fuel passageways for conducting the two gases to at least a mixing chamber and the oxygen to a cutting oxygen passageway. Suitable fuel and oxygen conduit means 23 and 25 connect these respective passageways to sources. Fittings 121, FIG. 1, provide interconnecting facility for connecting short conduit means 23, 25 with respective fuel and oxygen conduits 123, 125 that are, in turn, connected with suitable sources, such as high pressure cylinders with appropriate regulators and the like. These high pressure cylinders full of respectively oxygen and fuel and their respective regulators are conventional and need not be described herein.

From the foregoing, it can be seen that this invention effect the objects delineated hereinbefore.

Although this invention has been described with a certain degree of particularly, it is understood that the present disclosure is made only by way of example and that numerous changes in the details of construction and the combination and arrangement of parts may be resorted to without departing from the spirit and the scope of the invention, reference for the latter purpose being had to the appended claims.

We claim:

1. A traveling torch comprising:
   a. a carriage mounted on at least three wheels including at least one driving wheel and adapted to traverse a track;
   b. power means for moving said carriage along said track, said power means being carried by said carriage with a major portion of its weight toward a first side;
   c. a torch holding means for holding a torch; said torch holding means being carried by said carriage with a major portion of its weight toward said first side; said torch holding means being asymmetrically mounted and extending above and across said carriage so as to carry said torch laterally beyond the second side of said carriage;
   d. a torch having a body, a tip and respective fuel and oxygen passageways connected with respective fuel and oxygen conduit means for conveying respective fuel and oxygen to respective fuel and oxygen passageways in said torch;
   e. flexible fuel and oxygen conduit means connected with respective fuel and oxygen sources and said fuel and oxygen conduit means on said traveling torch.

2. The traveling torch of claim 1 wherein said power means includes an electric motor and said motor and wiring is disposed at said first side so as to be away from the heat generated by said torch.

3. The traveling torch of claim 1 wherein said torch holding means includes a rack holder that includes a substantially vertically oriented member and a substantially horizontally oriented member that is slidably connected with said vertically oriented member so as to accomodate disposing said torch at a plurality of distances from said second side and still provide a stable traveling torch when running.

4. The traveling torch of claim 3 wherein said substantially horizontal member includes a rack handle for picking up and carrying said traveling torch.

5. The traveling torch of claim 3 wherein said rack holder includes a bushing that does not require lubrication.

6. The traveling torch of claim 3 wherein said rack holder includes an on-center torch holder.

7. The traveling torch of claim 1 wherein said carriage is bi-directional with controls disposed at each end of said carriage and accessible to an operator.

8. The traveling torch of claim 1 wherein said carriage has all its control knobs and protrusions within its longitudinal and lateral dimensions such that there are no protrusions exteriorly, longitudinally and laterally of said carriage.

9. The traveling torch of claim 1 wherein said carriage has a substantially flat, planar top to facilitate mounting other equipment.

10. The traveling torch of claim 1 wherein said wheels include two rear wheels; said rear wheels being designed with triple capability of driving said carriage by engaging a planar surface, by engaging a standard groove track and by engaging an angle iron track.

11. The traveling torch of claim 10 wherein said wheels include a smooth cylindrical section and a grooved section.

12. The traveling torch of claim 10 wherein an angle iron track is provided for guiding and carrying said traveling torch; said angle iron track includes angle iron joined with spacers intermediate the respective long joints of angle iron.

13. The traveling torch of claim 1 wherein said power means incudes a power takeoff means for driving accessories.

14. The traveling torch of claim 1 wherein said power means includes a variable speed traction drive means for traveling at a plurality of respective speeds and a direct reading speed indicator is connected with said drive means and adapted to indicate the speed directly.

* * * * *